US010545016B2

(12) United States Patent
Akagawa et al.

(10) Patent No.: US 10,545,016 B2
(45) Date of Patent: Jan. 28, 2020

(54) LIGHT MEASUREMENT DEVICE AND OPTICAL AXIS ADJUSTMENT METHOD

(71) Applicants: NEC CORPORATION, Tokyo (JP); NATIONAL UNIVERSITY CORPORATION KAGAWA UNIVERSITY, Takamatsu-shi, Kagawa (JP)

(72) Inventors: Takeshi Akagawa, Tokyo (JP); Masahiro Kubo, Tokyo (JP); Katsumi Abe, Tokyo (JP); Kimiyasu Takoh, Tokyo (JP); Ersin Altintas, Tokyo (JP); Yuji Ohno, Tokyo (JP); Tetsuri Ariyama, Tokyo (JP); Ichiro Ishimaru, Kagawa (JP)

(73) Assignees: NEC CORPORATION, Tokyo (JP); NATIONAL UNIVERSITY CORPORATION KAGAWA UNIVERSITY, Takamatsu-shi, Kagawa (JP)

( * ) Notice: Subject to any disclaimer, the term of this patent is extended or adjusted under 35 U.S.C. 154(b) by 0 days.

(21) Appl. No.: 16/322,592

(22) PCT Filed: Aug. 7, 2017

(86) PCT No.: PCT/JP2017/028608
§ 371 (c)(1),
(2) Date: Feb. 1, 2019

(87) PCT Pub. No.: WO2018/034188
PCT Pub. Date: Feb. 22, 2018

(65) Prior Publication Data
US 2019/0204065 A1    Jul. 4, 2019

(30) Foreign Application Priority Data
Aug. 18, 2016 (JP) .................................. 2016-160516

(51) Int. Cl.
*G01B 9/02* (2006.01)
*G01J 3/45* (2006.01)

(52) U.S. Cl.
CPC ..... *G01B 9/02067* (2013.01); *G01B 9/02041* (2013.01); *G01J 3/45* (2013.01)

(58) Field of Classification Search
CPC ............ G01B 9/02041; G01B 9/02049; G01B 9/02061; G01B 9/02067; G01B 9/02068; G01B 9/02097; G01B 9/02098
See application file for complete search history.

(56) References Cited

U.S. PATENT DOCUMENTS

| | | | | |
|---|---|---|---|---|
| 4,385,835 A | * | 5/1983 | Westerberg ........ | G01B 9/02067 356/498 |
| 2011/0176138 A1 | | 7/2011 | Khalil et al. | |
| 2015/0049343 A1 | * | 2/2015 | Shaked .............. | G01B 9/02057 356/503 |

FOREIGN PATENT DOCUMENTS

| | | |
|---|---|---|
| JP | 63-168502 A | 7/1988 |
| JP | 03-097608 U | 10/1991 |

(Continued)

OTHER PUBLICATIONS

"Biomedical Photonics—Biomedical Optical Foundation and Application," The Institute of Electrical Engineers of Japan, Ohmsha, Ltd. Apr. 30, 2009, ( 8 Pages total).

(Continued)

*Primary Examiner* — Jonathan M Hansen
(74) *Attorney, Agent, or Firm* — Sughrue Mion, PLLC (57) ABSTRACT

A light measurement device that maintains high measurement precision. The light measurement device includes: light source that irradiates light upon measurement object; branch part that splits transmitted light or reflected light from measurement object; phase-changing unit that changes the phase of one beam of the branched light beams; phase- (Continued)

fixing unit that maintains the phase of the other beam of the branched light beams; adjustment mechanism, which is provided in phase-changing unit or phase-fixing unit, for adjusting the propagation direction of light; multiplexer that causes the light emitted by each of phase-changing unit and phase-fixing unit to interfere with each other; detection unit that detects light that is interfered with by multiplexer; and control unit that controls the adjustment mechanism on the basis of the luminance values of an interference image that is detected by detection unit and adjusts the propagation direction of light in phase-changing unit or phase-fixing unit.

10 Claims, 7 Drawing Sheets

(56) References Cited

FOREIGN PATENT DOCUMENTS

| | | |
|---|---|---|
| JP | 05-180696 A | 7/1993 |
| JP | 2009-198205 A | 9/2009 |
| JP | 2011-215084 A | 10/2011 |
| WO | 2012/063551 A1 | 5/2012 |

OTHER PUBLICATIONS

International Search Report of PCT/JP2017/028608 dated Oct. 31, 2017 [PCT/ISA/210].

* cited by examiner

LIGHT MEASUREMENT DEVICE AND OPTICAL AXIS ADJUSTMENT METHOD

CROSS REFERENCE TO RELATED APPLICATIONS

This application is a National Stage of International Application No. PCT/JP2017/028608, filed Aug. 7, 2017, claiming priority based on Japanese Patent Application No. 2016-160516, filed Aug. 18, 2016, the contents of all of which are incorporated herein by reference in their entirety.

TECHNICAL FIELD

The present invention relates to a light measurement device and to a method of adjusting an optical axis.

BACKGROUND ART

With the development of technology in recent years, various light measurement devices that employ light interference have been developed. There are various types of devices based on interferometers that use the interference of light, and these devices are used according to the purpose. Fizeau interferometers and Mach-Zehnder interferometers have been used for the purpose of performing high-precision planar measurement and spherical measurement by using a simple construction.

As an example of an interferometer, a laser interference device that uses a Fizeau interferometer is disclosed in Patent Document 1. Referring to FIGS. 1 and 2 of Patent Document 1, the laser interference device both irradiates the measurement object and irradiates a reference master standard with laser light by way of a beam splitter and collimator lens and condenses the reflected light from the reference surface of the reference master standard and the detection surface of the measurement object upon a translucent screen by way of collimator lens and beam splitter. A light-dot imaging lens and interference fringe imaging lens are arranged on the optical path behind the screen so as to allow exchange and a solid-state imaging device is provided at the focal point position of the light-dot imaging lens. The light dot image on the screen is captured using the light-dot imaging lens, and the interference fringe that passes through the screen is observed using the interference fringe imaging lens.

The technology of Optical Coherence Tomography (OCT) is widely utilized in the field of, for example, funduscopy. OCT is a technology that allows non-invasive imaging at a spatial resolution of approximately 10 μm of a tomographic image having a depth of 1-2 mm of biological tissue. OCT takes as a basis a Michelson interferometer that uses low-coherence light. OCT irradiates light upon bio-tissue, selectively detects the straight advancing light component that is reflected from inside the tissue, and based on this detection, constructs a two-dimensional or three-dimensional tomographic image.

Figure 1:
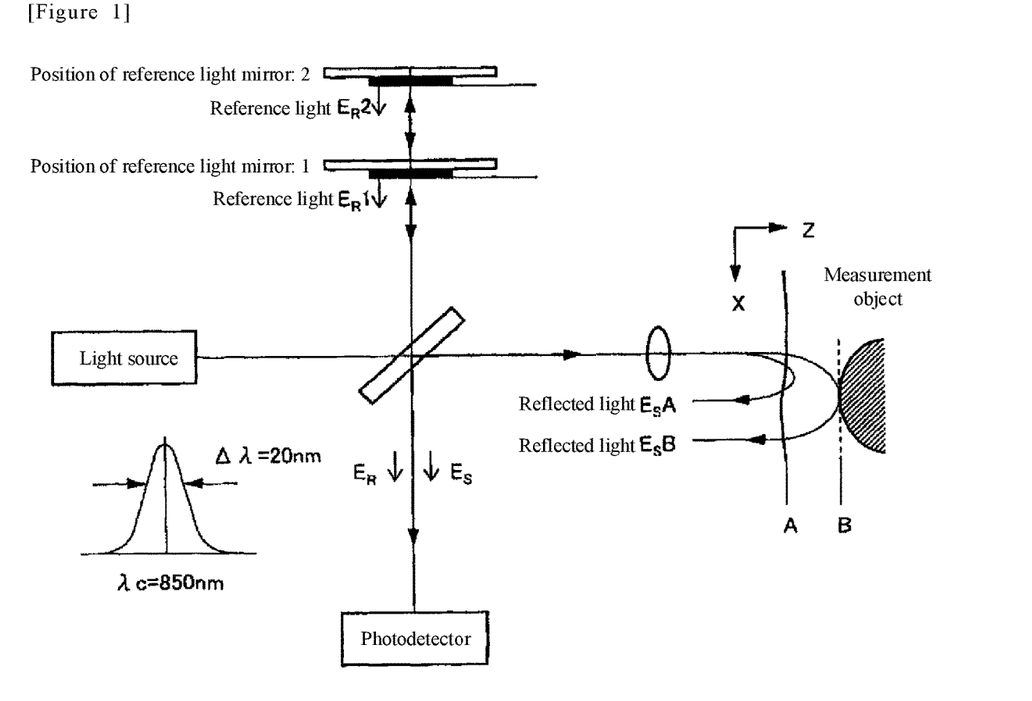
FIG. 1 shows the configuration of optical coherence tomography in the related art.

For example, Non-Patent Document 1 describes a schematic diagram that shows the basic configuration of OCT. FIG. 1 is borrowed from FIG. 5.1 of Non-Patent Document 1. The basic configuration of OCT includes a light source, a reference light mirror, a beam splitter, and a photodetector. The measurement object is, for example, an organism.

The light source emits low-coherence light of the near-infrared region. Low-coherence light refers to light having extremely low temporal coherence. Further, the light source is made up of Super Luminescent Diodes (SLDs).

As shown in FIG. 1, the light source emits low-coherence light toward the beam splitter. At this time, the low-coherence light is assumed to have a center wavelength of 850 nm and a full width at half maximum of spectrum of 20 nm.

The light from the light source is split into two by the beam splitter. One beam of the light that was split into two by the beam splitter is directed toward the reference mirror, and after being reflected by the reference mirror, is again returned to the beam splitter as reference light $E_R$. The other beam of the light that was split into two by the beam splitter is irradiated toward the measurement object as measurement light. The innumerable beams of reflected light (signal light) $E_S$ (as examples, reflected light $E_S A$ and $E_S B$) from the surface and interior of the measurement object return to the beam splitter. Half of each of the beams of reference light $E_R$ and reflected light $E_S$ that have returned back to the beam splitter converge on the same optical path and interfere with each other before the photodetector.

As shown in FIG. 1, particular reflection surfaces of the surface and interior of the measurement object along the direction of propagation of the signal light are here taken as A and B. Taking the beam splitter as a point of reference, if reflection surface A inside the measurement object and position 1 of the reference light mirror are optically equidistant, the time periods of the sine wave oscillation of reference light $E_R 1$ and reflected light $E_S A$ overlap and the two undergo interference. As a result, the photodetector obtains interference light of reference light $E_R 1$ and reflected light $E_S A$. Next, in order to obtain the interference light of reference light $E_R 2$ and reflected light $E_S B$, the reference light mirror is moved in a direction away from the beam splitter and up to position 2 that is equidistant with reflection point B. In this way, the photodetector can obtain the intensity distribution of reflected light in the direction of the optical axis by continuously moving the reference mirror to detect interference light.

As described hereinabove, there are various light measurement devices that use the interference of light, and a variety of schemes have been implemented and forms adopted according to the object of the devices.

However, in the technology described in Patent Document 1, the light-dot imaging lens used when adjusting the optical axis and the interference fringe imaging lens for observing an interference fringe must be arranged on the optical path so as to allow exchange, and this requirement entails such problems as an increase in complexity of the configuration and an increase in the number of parts. In addition, the operations of optical axis adjustment and observation of interference fringe are accompanied by the operation of each time exchanging these lenses, and as a result, there is the problem that rapid measurements cannot be realized when specimens are frequently exchanged and measured.

One example of a technology for solving these problems is disclosed in Patent Document 2. As shown in FIG. 1 of Patent Document 2, a technology is disclosed in Patent Document 2 that relates to an interferometer that allows simplification of the configuration and that allows interference fringe observation to be rapidly carried out after optical axis adjustment. According to the invention disclosed in Patent Document 2, when the optical axis of the reference surface of the reference lens coincides with the optical axis of the inspection surface of a specimen, the interference light beam passes through a half-mirror surface and the opening of a diaphragm plate and is condensed by a condensing optical system, and then an image of the interference fringe is captured by an imaging unit.

On the other hand, when the optical axis of the reference surface of the reference lens does not coincide with the optical axis of the inspection surface of a specimen, the optical axis of the reference light that is reflected by the reference surface diverges from that of the measurement light that is reflected by the inspection surface, and at least one of the beams reaches the reflection surface of the diaphragm plate to produce a component that is reflected on the half-mirror surface side. This reflected light component on the reflecting surface reaches the half-mirror surface and a portion of this reflected light passes through the opening of the diaphragm plate and is condensed by the condensing optical system. Since the condensing optical system is provided so that the reflecting surface of the diaphragm plate and the imaging surface of the imaging unit are conjugated by the way of the half-mirror surface, the image of the reflected light component on the reflecting surface of the diaphragm plate can be captured by the imaging unit. As a result, the positional shift of the reference light and the measurement light with respect to the opening of the diaphragm plate can be observed through the imaging unit. Accordingly, the observation during the optical axis adjustment and observation of the interference fringe can be carried out based on the image that was captured by the imaging unit without exchanging the condensing optical system.

In addition, an image processing device and interferometer measurement system that can simplify the device configuration for displaying the image of an interferometer and improve the workability of interference fringe measurement are disclosed in Patent Document 3.

Referring to FIG. 1 of Patent Document 3, the image processing device has: a connection terminal unit that connects an alignment camera that captures images for alignment with an interference fringe camera that captures an interference fringe image and that transmits image data that are transmitted from the cameras; a camera changeover switch that selects, of the image data that have been transmitted, an alignment image or an interference fringe image; a display unit that displays images according to the selected image data; an image processing unit that analyzes image data of an interference fringe image; and a device control unit that, when image data of an interference fringe image has been selected by the camera changeover switch, displays the analysis results that have been analyzed by the image processing unit together with interference fringe image on the display unit.

LITERATURE OF THE PRIOR ART

Patent Documents

Patent Document 1: Japanese Utility Model (Registration) Application Laid-Open Publication No. H03-097608 (p. 20, FIG. 1 and FIG. 2)
Patent Document 2: Japanese Unexamined Patent Application Publication No. 2009-198205 (FIG. 1)
Patent Document 3: Japanese Unexamined Patent Application Publication No. 2011-215084 (FIG. 1)

Non-Patent Documents

Non-Patent Document 1: Journal of Next-Generation Medical Laser Applied Technology, "Biomedical Photonics—Biomedical Optical Foundation and Application," The Institute of Electrical Engineers of Japan, Ohmsha, Ltd. 2009/04/30, pp. 126-129

DISCLOSURE OF THE INVENTION

Problem to be Solved by the Invention

However, in the light measurement devices described in Non-Patent Document 1 and Patent Documents 1-3, it is difficult to maintain high measurement precision. The reasons for this difficulty are as described below.

Optical devices, and in particular spatial optical devices, experience great changes in the state of the optical system, and the optical axes and the position of optical components are difficult to continuously maintain over a long time period. In addition, once the state has changed, a great deal of time is required to make adjustments to restore the original position or optical axis of the optical component. This situation is caused by changes in the positions or angles that result from loosening due to vibrations or gravity of parts such as screws that make up an optical apparatus optical system. As a consequence, the optical axis of light that is supplied from a light source or the state or position of optical components that make up the subsequent optical path are no longer the same as the initial one.

In addition, the provision of a micro-adjustment mechanism is also desirable because changes may occur in the refractive index due to differences in the air density caused by the influence of air flow caused by temperature changes or the environment or air conditioning, and the state of the overall system may also change.

For example, an interferometer is proposed in Patent Document 2 in which the reflected light from a reference surface and the reflected light from an inspection surface are superimposed to cause interfere with each other and to form an interference light beam and then the interference image of this interference light beam is observed. However, the actual method of maintaining a high level of interference is not disclosed in Patent Document 2. It is difficult to maintain a high measurement precision. Further, in Patent Document 3, although the device configuration for the image display of an interferometer is proposed for an image processing device and interferometer measurement system, no disclosure is made regarding the actual method relating to adjustment of optical components and optical axis.

The present invention is for solving the problems of the above-described technology and it is an object of the present invention to provide a light measurement device and a method of adjusting optical axis that can maintain high measurement precision.

Means for Solving the Problem

The light measurement device of the present invention for achieving the above-described object includes:
a light source that irradiates light upon a measurement object;
a phase-changing unit that changes a phase of first light that is one beam from among two split light beams realized by splitting transmitted light or reflected light of the light from the measurement object;
a phase-fixing unit that maintains a phase of second light that is the other beam of the two split light beams;
an adjustment mechanism that adjusts a propagation direction of the first light that is supplied from the phase-changing unit or a propagation direction of the second light that is supplied from the phase-fixing unit;
a multiplexer that causes interference between the first and second light that are supplied from the phase-changing unit and the phase-fixing unit, respectively;

an imaging element that detects light that is interfered with by the multiplexer; and a control unit that controls each of a phase change operation of the phase-changing unit and an adjustment operation of the propagation direction of light of the adjustment mechanism.

The control unit causes the phase-changing unit to change the phase of the first light, causes the imaging element to detect a first interference image, and on the basis of the luminance values of three bright portion points in an image that shows the first interference image that is supplied from the imaging element, adjusts the propagation direction of the first or second light in the adjustment mechanism.

In addition, the method of adjusting the optical axis of the present invention is an optical axis adjustment method of a light measurement device that includes: a light source that irradiates light upon a measurement object; a phase-changing unit that changes a phase of first light that is one beam from among two split light beams realized by splitting transmitted light or reflected light of the light from the measurement object; a phase-fixing unit that maintains a phase of second light that is the other beam of the two split light beams; an adjustment mechanism that adjusts a propagation direction of the first light that is supplied from the phase-changing unit or a propagation direction of the second light that is supplied from the phase-fixing unit; a multiplexer that causes interference between the first and second light that are supplied from the phase-changing unit and the phase-fixing unit, respectively; and an imaging element that detects light that is interfered with by the multiplexer, the method including:

causing the phase-changing unit to change the phase of the first light and causing the imaging element to detect a first interference image; and on the basis of the luminance values of three bright portion points in an image that shows the first interference image that is supplied from the imaging element, adjusting the propagation direction of the first or second light by the adjustment mechanism.

Effect of the Invention

The present invention enables the maintenance of high measurement precision.

EXAMPLE EMBODIMENTS

Example embodiments of the present invention are next described with reference to the accompanying drawings.

First Example Embodiment

Figure 2:
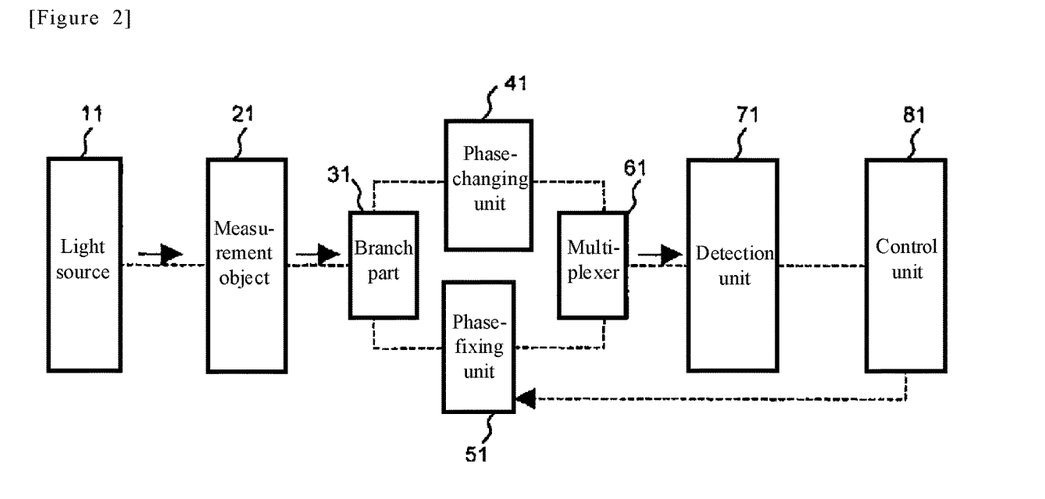
FIG. 2 is a block diagram showing an example of the configuration of the light measurement device of the first example embodiment.

The configuration of the light measurement device of the first example embodiment of the present invention is next described. FIG. 2 is a block diagram showing an example of the configuration of the light measurement device of this example embodiment.

The light measurement device of the present example embodiment is used for gravitational wave detection, light speed measurement, spectrum measurement, reference length measurement, shape measurement and the like. Here, as one example, the configuration of a light measurement device is described in which a Michelson interferometer is applied.

As shown in FIG. 2, the light measurement device includes: light source 11 that irradiates light upon measurement object 21; branch part 31 that branches transmitted light or reflected light of measurement object 21 realized by light supplied from light source 11; phase-changing unit 41 that gives a phase change to one beam from among the branched light beams; phase-fixing unit 51 that does not give a phase change to the other beam of the branched light beams; multiplexer 61 that causes interference between light supplied from phase-changing unit 41 and light supplied from phase-fixing unit 51; detection unit 71 that detects light that is interfered by multiplexer 61; and control unit 81 that records the luminance values of an interference image or information of the intensity of light that is detected by detection unit 71 and that controls the adjustment mechanism to adjust the propagation direction of at least one light beam of the branched light beams.

In FIG. 2, the propagation direction of light is indicated by solid-line arrows.

A light source that can supply, for example, near-infrared light on the order of from 0.78 µm to 2.5 µm is used for light source 11. However, the wavelength region of the light that is used is not limited to near-infrared light and may also be ultraviolet light (on the order of 0.01 µm-0.38 µm), visible light (on the order of 0.38 µm-0.78 µm), mid-infrared light (on the order of 2.5 µm-25 µm), or far-infrared light (on the order of 25 µm-100 µm). Further, a laser light source may be used for light source 11.

Measurement object 21 may be, for example, a liquid or an organism but is not limited to a liquid or an organism as long as measurement object 21 transmits or reflects light. Light that passes through or that is reflected by measurement object 21 is split into two by branch part 31.

Figure 3:
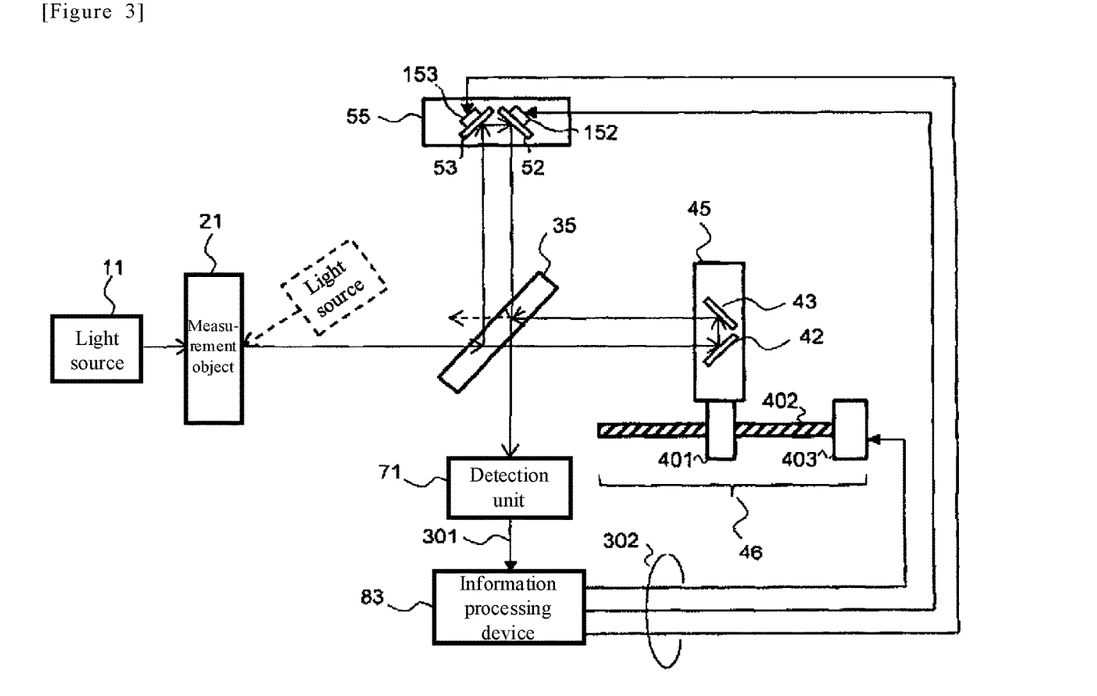
FIG. 3 shows an example of the configuration of the optical system of the light measurement device of the first example embodiment.

FIG. 3 shows an example of the configuration of the optical system of the light measurement device of the present example embodiment. In FIG. 2 and FIG. 3, the direction of a signal (or data) is shown by unidirectional arrows, but this simple representation of the direction of the flow of signals (data) does not preclude bidirectionality.

As shown in FIG. 3, beam splitter 35 is arranged in the propagation direction of the transmitted light or reflected light of measurement object 21. In the present example embodiment, beam splitter 35 serves the role of branch part 31 and multiplexer 61 shown in FIG. 2.

When beam splitter 35 is used for branch part 31 as in the present example embodiment, two light beams that are split by beam splitter 35 propagate on separate optical paths. One optical path corresponds to phase-changing unit 41 that gives a phase change, and the other optical path corresponds to phase-fixing unit 51 that does not give a phase change.

In phase-changing unit 41, mirrors 42 and 43 that are arranged at an inclination of 45 degrees with respect to the optical axis are provided on moving stage 45 for one beam from among the light beams that are branched by beam splitter 35. In phase-fixing unit 51, mirrors 52 and 53 that are arranged with an inclination of 45 degrees with respect to the optical axis are provided on stage 55 for the other beam that is branched by beam splitter 35.

Angle adjustment units 152 and 153 for changing the direction of mirrors 52 and 53 with respect to the optical axis are provided on mirrors 52 and 53. Stepping motors (not shown) that cause mirrors 52 and 53 to rotate around a central axis are provided on angle adjustment units 152 and 153. One axis of the rotational axes of mirrors 52 and 53 is preferably in the horizontal direction, and the other axis is preferably in the vertical direction. The stepping motors (not shown) provided on each of angle adjustment units 152 and 153 and stepping motor 403 are connected with information processing device 83 by way of signal line 302.

Angle adjustment units 152 and 153 adjust the angles of mirrors 52 and 53 by driving the stepping motors (not shown) in accordance with a control signal received from information processing device 83. The propagation direction of light reflected by mirror 53 is adjusted by means of this angular adjustment. Angle adjustment units 152 and 153 are adjustment mechanisms for adjusting the propagation direction of light. The adjustment mechanism is for adjusting the optical axis when acquiring an interference image, and the optical axis of any direction can be produced by adjusting the orientation of mirrors 52 and 53.

Movement mechanism 46 is provided on moving stage 45. Movement mechanism 46 includes: movement guide 401 that holds moving stage 45; screw axle 402 that passes through movement guide 401; and stepping motor 403 that causes the screw axle to rotate.

In movement mechanism 46, stepping motor 403 rotates in accordance with a control signal that is received from information processing device 83, and movement guide 401 moves horizontally (in the left-right direction of FIG. 3) in accordance with this rotation. In this way, when light that passes via phase-changing unit 41 and light that passes by way of phase-fixing unit 51 are interfered with by multiplexer 61, the phases of these light beams can be adjusted to differ.

In phase-changing unit 41, light that is incident from beam splitter 35 is turned back by a mirror group composed of mirrors 42 and 43. The reflected light from the mirror group is directed toward beam splitter 35. When moving stage 45 is moved by movement mechanism 46, the position with respect to the direction of the optical axis of the mirror group changes. The length of the optical path of phase-changing unit 41 is changed by the change of the position of the mirror group, with the result that a phase difference occurs when the light of phase-changing unit 41 is multiplexed with the light from phase-fixing unit 51 in multiplexer 61.

Multiplexer 61 multiplexes the light from phase-changing unit 41 and phase-fixing unit 51. As a result, the light from phase-changing unit 41 interferes with the light from phase-fixing unit 51.

According to the configuration shown in FIG. 3, light from measurement object 21 is split into two by beam splitter 35, following which the two split light beams are each reflected and then returned to beam splitter 35. In this case, branch part 31 and multiplexer 61 have the same configuration.

Detection unit 71 includes an imaging element (not shown) for detecting an interference image. Light that is multiplexed by multiplexer 61 and that is interfered with is detected by detection unit 71. As shown in FIG. 3, detection unit 71 is connected to information processing device 83 that includes control unit 81 shown in FIG. 2 by way of signal line 301. Information of the luminance values of the interference image that is two-dimensionally imaged by detection unit 71 is transmitted to control unit 81 by way of signal line 301.

Figure 4:
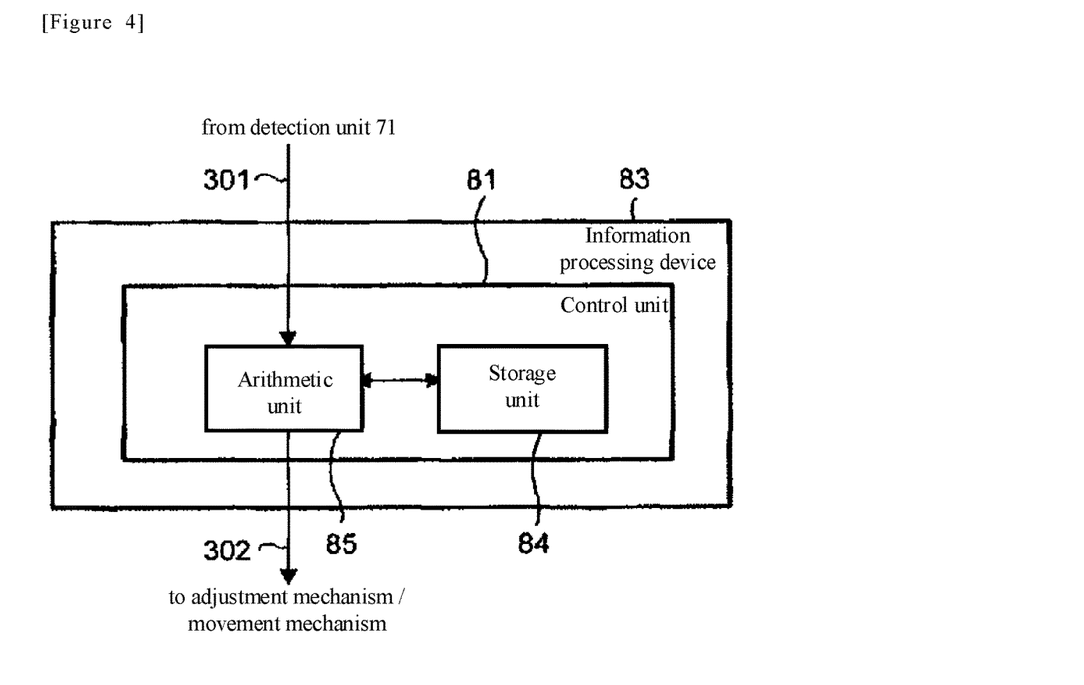
FIG. 4 is a block diagram showing an example of the configuration of the information processing device shown in FIG. 3.

FIG. 4 is a block diagram showing an example of the configuration of the information processing device shown in FIG. 3. Further, in FIG. 4, the direction of signals (or data) is shown by unidirectional arrows, but this is a simple representation of the direction of the flow of signals (data) and does not preclude bidirectionality.

Information processing device 83 is, for example, a personal computer. As shown in FIG. 4, information processing device 83 includes control unit 81 that includes storage unit 84 and arithmetic unit 85. Storage unit 84 is, for example, a semiconductor memory such as flash memory or RAM (Random Access Memory). Arithmetic unit 85 is, for example, a CPU (Central Processing Unit). Storage unit 84 stores in advance programs relating to the optical axis adjustment method of the present example embodiment and information of threshold values that are used in the determinations. In addition, information such as the luminance values of interference images that are detected by detection unit 71 is recorded in storage unit 84. Arithmetic unit 85 executes processing in accordance with programs that are stored in storage unit 84. Details of the processing realized by control unit 81 will be described hereinbelow.

Although not shown in FIG. 4, a display unit for displaying interference images to allow an operator to observe interference images and a console for input instructions from the operator may also be provided in information processing device 83.

Further, as shown in FIG. 3, a case is described in the present example embodiment in which light supplied from light source 11 is transmitted through measurement object 21 and the transmitted light then measured, but light source 11 may be provided at the position shown by a broken line and the reflected light of measurement object 21 then measured.

In addition, although a case is described in the present example embodiment in which the adjustment mechanism is provided in phase-fixing unit 51, the adjustment mechanism may also be provided in phase-changing unit 41, or the adjustment mechanism may be provided in both phase-fixing unit 51 and phase-changing unit 41. Providing the adjustment mechanism on the phase-fixing unit 51 side rather than in the phase-changing unit 41 has the advantage of enabling a suppression of complexity of optical axis adjustment because the phase does not change. In addition, the adjustment mechanism and movement mechanism 46 are not limited to the configurations shown in FIG. 3.

Figure 5:
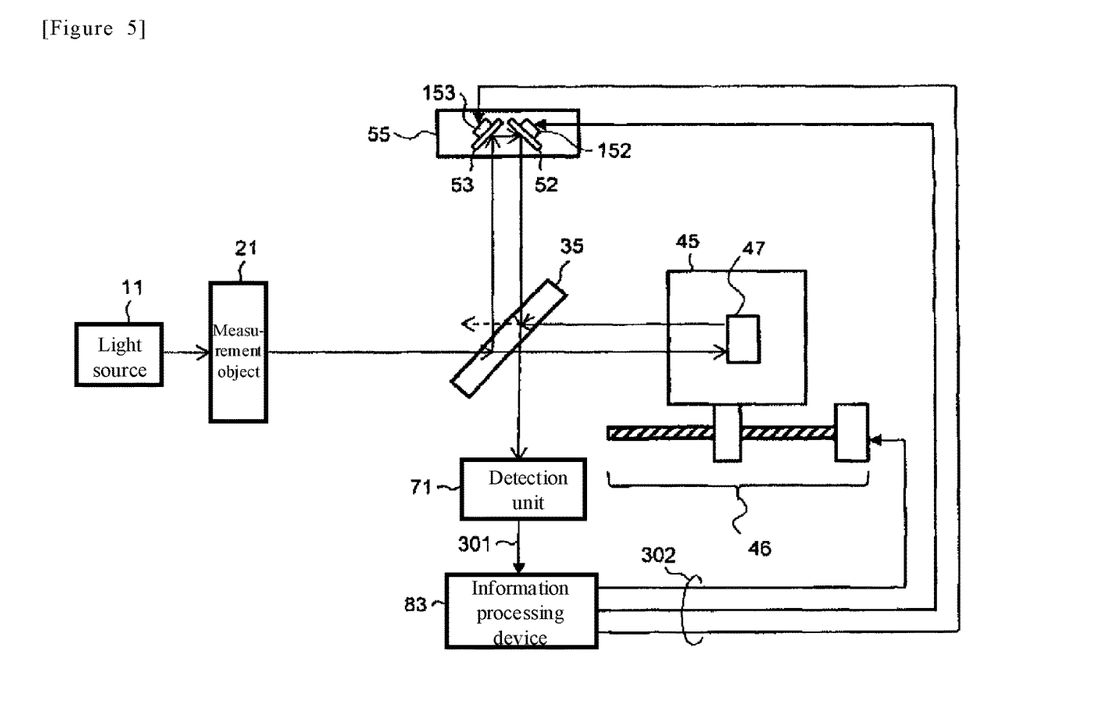
FIG. 5 shows another example of the configuration of the optical system of the light measurement device of the first example embodiment.

In addition, although a case is described in the present example embodiment in which the optical path of phase-changing unit 41 uses two mirrors, a corner-cube mirror or a corner-cube prism may also be used in place of two mirrors. FIG. 5 shows another example of the configuration for the optical system of the light measurement device of the present example embodiment. In the configuration shown in FIG. 5, corner-cube mirror 47 is provided on moving stage 45 in place of mirrors 42 and 43 shown in FIG. 3. If a corner-cube mirror or a corner-cube prism is used, light can be reliably returned in the directly opposite direction of the propagation direction of light from branch part 31. Further, in FIG. 5, the direction of signals (or data) is shown by unidirectional arrows, but this is a simple representation of the direction of the flow of signals (data) and does not preclude bidirectionality.

In the present example embodiment, moreover, beam splitter 35 is used as branch part 31, but depending on the use, it is not always necessary to branch the light quantity into two units.

The method of adjusting the optical axis according to the light measurement device of the present example embodiment is next described.

Figure 6:
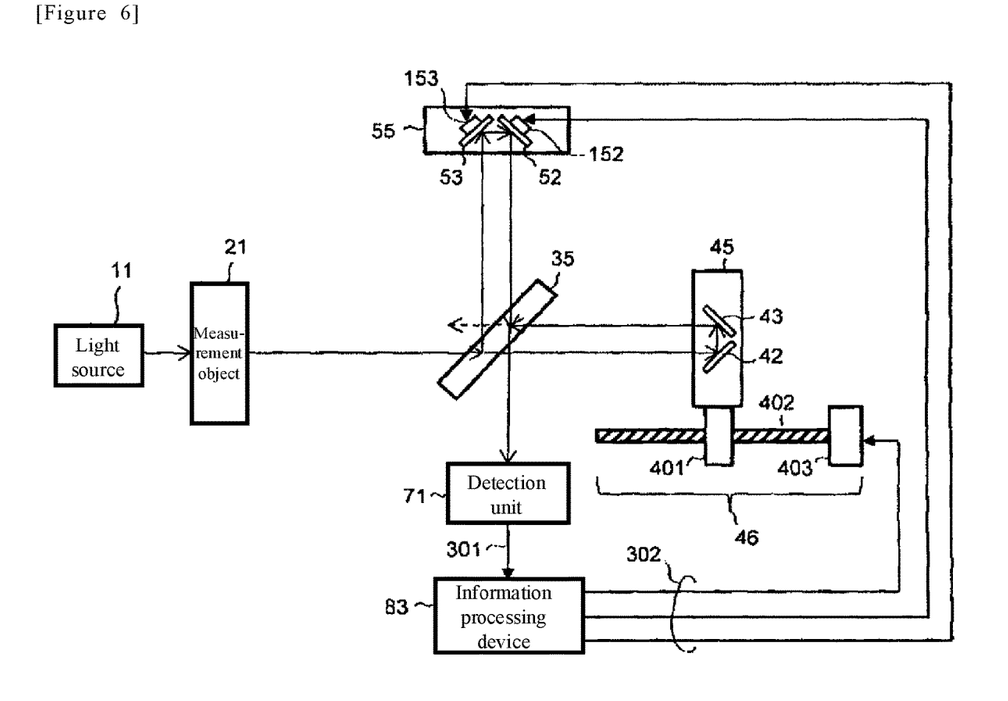
FIG. 6 is a view for describing the optical axis adjustment method in the light measurement device shown in FIG. 3.
Figure 7:
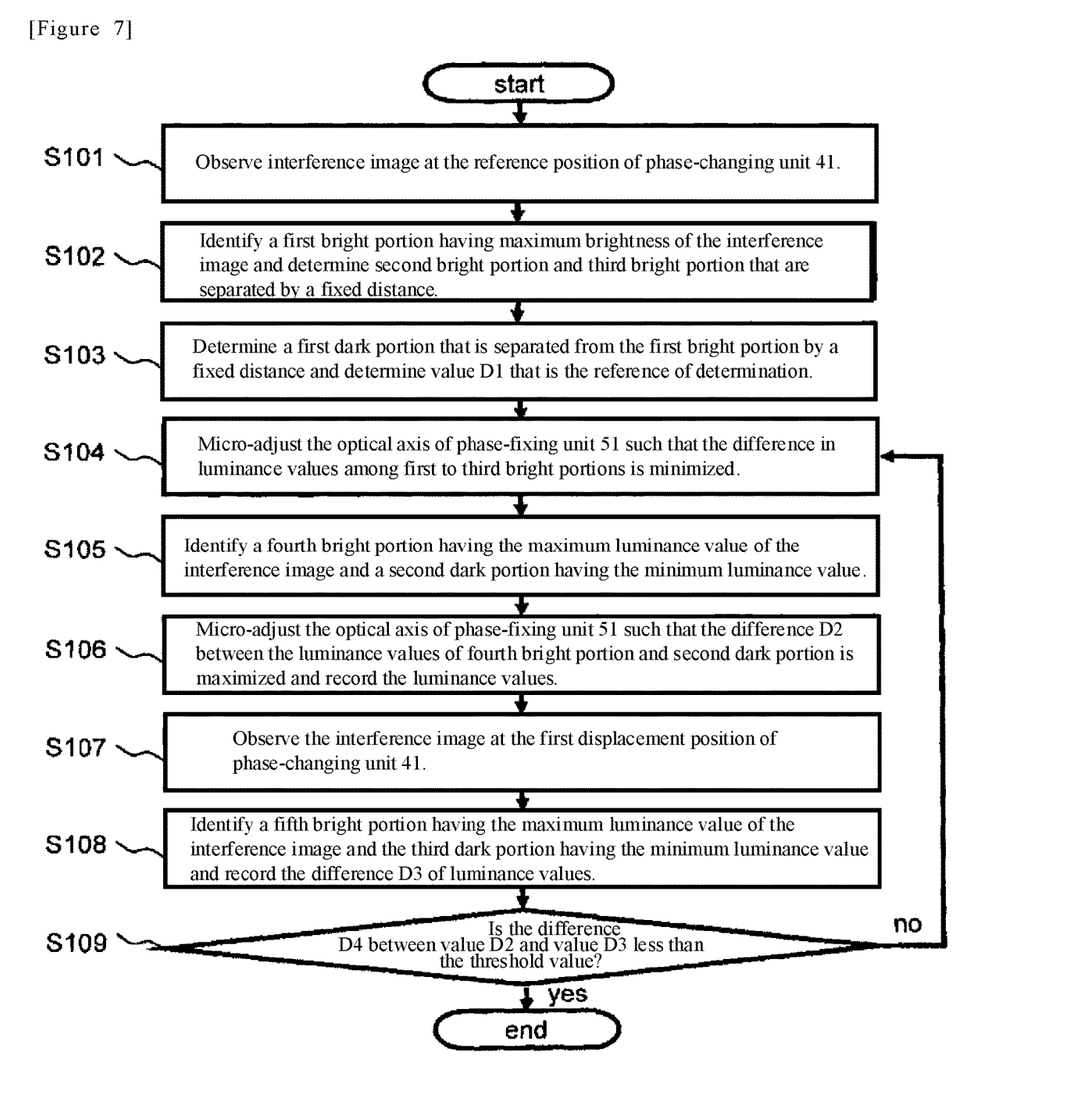
FIG. 7 is a flow chart that shows the procedures of the optical axis adjustment method in the first example embodiment.
Figure 8:
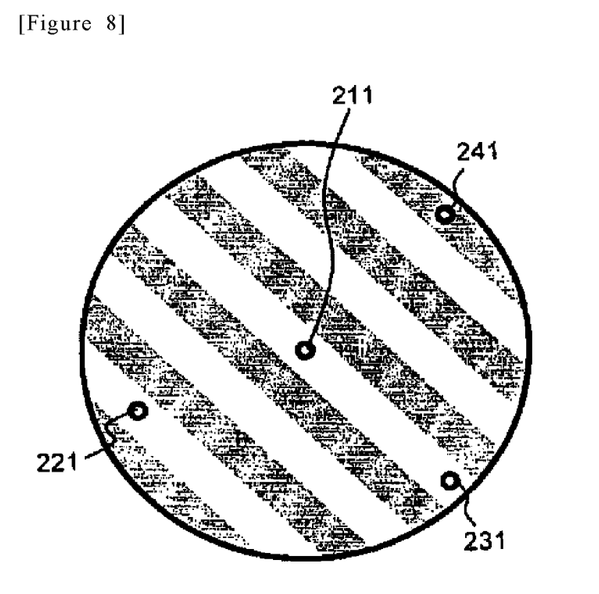
FIG. 8 is a schematic view showing an example of the detected image of the interference image in Step S102 of the procedures shown in FIG. 7.
Figure 9:
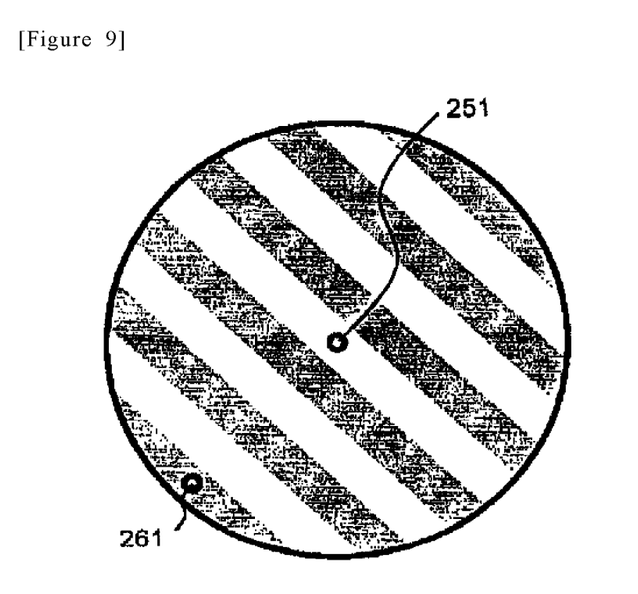
FIG. 9 is a schematic view showing an example of the detected image of the interference image in Step S105 of the procedures shown in FIG. 7.
Figure 10:
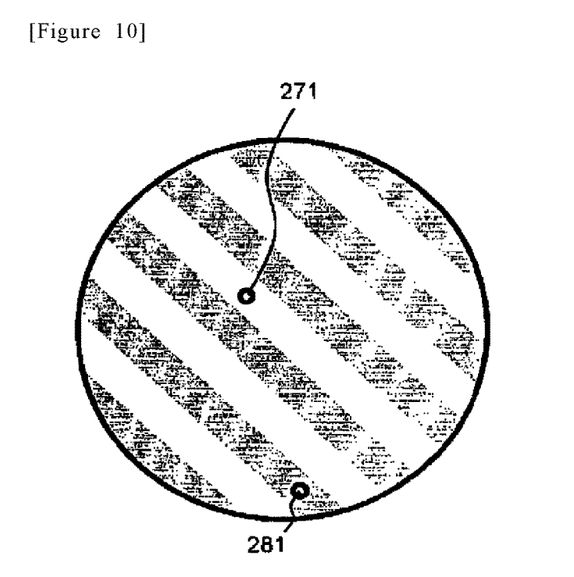
FIG. 10 is a schematic view showing an example of the detected image of the interference image in Step S107 of the procedures shown in FIG. 7.

FIG. 6 is a view for describing the optical axis adjustment method in the light measurement device shown in FIG. 3. FIG. 7 is a flow chart showing the procedures of the optical axis adjustment method in the present example embodiment. FIG. 8 to FIG. 10 are schematic views showing examples of the detected image at the time of measurement of an interference image in the procedures shown in FIG. 7. Further, in FIG. 6, the direction of signals (or data) is shown by unidirectional arrows, but this is a simple representation of the direction of the flow of signals (data) and does not preclude bidirectionality.

The optical axis adjustment method of the present example embodiment is a method of controlling an adjustment mechanism to adjust the propagation direction of light in phase-fixing unit 51 on the basis of the luminance values of an interference image that is detected by detection unit 71.

First, regarding the position of moving stage 45, the position at which the lengths of the optical path of phase-changing unit 41 and the optical path of phase-fixing unit 51 are equivalent is assumed to be the initial position. Control unit 81 causes moving stage 45 to move from the initial position to a reference position that is the position at which detection unit 71 first detects an interference image and then adjusts the length of the optical path of phase-changing unit 41. Control unit 81 observes this interference image at the reference position of moving stage 45 and records the luminance values of the interference image (Step S101). This interference image at the reference position corresponds to the first interference image.

As shown in the example of the detected image of the interference image of FIG. 8, control unit 81 distinguishes first bright portion 211 for which the luminance value of the interference image becomes the maximum value, and then determines second bright portion 221 and third bright portion 231 that are separated by a fixed distance with this first bright portion 211 as the reference (Step S102). Second bright portion 221 and third bright portion 231 are points that are extracted with the aim of guaranteeing the uniformity within the interference image surface and are therefore preferably two points that are as remote as possible within the interference image surface with first bright portion 211 as the center.

Control unit 81 determines first dark portion 241 that is separated by a fixed distance from first bright portion 211 and records the difference in the luminance values of first bright portion 211 and first dark portion 241 (this value being taken as D1). Control unit 81 determines value D1 as the value that is to serve as the reference of determination described later (Step S103). At this time, the distance between first bright portion 211 and first dark portion 241 is preferably as great as possible.

Control unit 81 next finely adjusts the angles of mirrors 52 and 53 to adjust the propagation direction of the light of phase-fixing unit 51 such that the difference in brightness values among first bright portion 211, second bright portion 221, and third bright portion 231 are minimized (Step S104). At this time, control unit 81 records adjustment information that includes information of the direction of rotation and the angle of rotation of mirrors 52 and 53 and the changes of the luminance values of the first bright portion 211, second bright portion 221, and third bright portion 231 that accompany this adjustment. Control unit 81 finds by computation the trend of the changes of luminance values of first bright portion 211, second bright portion 221, and third bright portion 231 for the direction of adjustment of the angles of mirrors 52 and 53 on the basis of the recorded adjustment information and luminance values. Control unit 81 then adjusts the angles of mirrors 52 and 53 until the difference in luminance values between first bright portion 211 and second bright portion 221 and the difference in luminance values between first bright portion 211 and third bright portion 231 reach the same level.

As in Step S102 and as shown in the example of the detected image of the interference image of FIG. 9, control unit 81 identifies fourth bright portion 251 for which the luminance value of the interference image becomes the maximum value and second dark portion 261 for which the luminance value becomes the minimum value (Step S105).

In the interference image shown in FIG. 9, control unit 81 adjusts the propagation direction of the light of phase-fixing unit 51 by adjusting the angles of mirrors 52 and 53 such that the difference in luminance values between fourth bright portion 251 and second dark portion 261 (this value being taken as D2) is maximized and records the changes in the difference in luminance values between fourth bright portion 251 and second dark portion 261 together with adjustment information. Control unit 81 next, on the basis of the recorded adjustment information and information of luminance values, finds by computation the trend of the change of the difference between fourth bright portion 251 and second dark portion 261 for the adjustment of the propagation direction of the light of phase-fixing unit 51, and adjusts the propagation direction of the light of phase-fixing unit 51 until this difference becomes the maximum difference (Step S106).

Control unit 81 subsequently causes micro-movement of moving stage 45 until the fringe of bright and dark of the interference image inverts at least one time. The position of moving stage 45 when the fringe of the bright and dark of the interference image has inverted at least one time is taken as the first displacement position. At this position, control unit 81 observes the interference image that is detected by detection unit 71 and records the luminance values of the interference image (Step S107). The interference image at this first displacement position corresponds to the second interference image.

Still further, as shown in the example of the detected image of the interference image of FIG. 10, control unit 81 identifies, by image analysis, at the first displacement position, fifth bright portion 271 for which the luminance value of the interference image becomes the maximum value and third dark portion 281 for which the luminance value becomes the minimum value, and records the difference in luminance values between fifth bright portion 271 and third dark portion 281 (this value being taken as D3) (Step S108).

Control unit 81 hereupon determines whether the difference (this value being taken as D4) between the difference D2 in luminance values between fourth bright portion 251 and second dark portion 261 and difference D3 in luminance values between fifth bright portion 271 and third dark portion 281 is greater or smaller than a threshold value that has been set in advance (Step S109). The threshold value must be at least smaller than value D1 that is taken as the reference value of determination.

When value D4 is smaller than the above-described threshold value, control unit 81 ends the adjustment of the optical axis, and when value D4 is equal to or greater than the threshold value, control unit 81 again returns to Step S104 and repeats optical axis adjustment.

Although the optical axis adjustment is preferably carried out in accordance with the procedures shown in FIG. 7, the propagation direction of the light in phase-fixing unit 51 may also be adjusted on the basis of the luminance values of first bright portion 211, second bright portion 221, and third bright portion 231 in the first interference image and the luminance value of fifth bright portion 271 in the second interference image. The divergence of the angles of mirrors 52 and 53 (divergence of the propagation direction of light) can be predicted from the luminance values among first bright portion 211, second bright portion 221, and third bright portion 231. In addition, the divergence in directions of movement of moving stage 45 can be predicted from the divergence of the luminance value of a bright portion in the first interference image and the luminance value of a bright portion in the second interference image.

In addition, a certain effect can be obtained relating to optical axis adjustment by only adjusting the optical axis so as to minimize the differences in luminance values among first bright portion 211, second bright portion 221, and third bright portion 231 in Step S104.

In the present example embodiment, the transmitted light or reflected light from the measurement object is branched, the phase of one beam from among the branched light beams is maintained in the phase-fixing unit, the phase of the other beam from among the branched light beams is changed in the phase-changing unit, an interference image realized by the multiplexer causing interference between these light beams is detected in the detection unit, and an adjustment mechanism is provided in the phase-fixing unit or the phase-changing unit for adjusting the propagation direction (optical axis) of the light. The control unit controls the adjustment mechanism on the basis of the luminance values of the interference image such that the optical axis becomes the normal direction, whereby the optical axis is adjusted and an interference image having higher brightness can be obtained.

In the light measurement device of the present example embodiment, since a clear interference image can be obtained, high measurement precision can be maintained.

Second Example Embodiment

The light measurement device according to the second example embodiment of the present invention is of basically the same configuration as the device of the first example embodiment but differs from the first example embodiment in that the phase of light that passes through phase-changing unit 41 is continuously changed to perform spectrum measurement.

The configuration and operation of the light measurement device of the present example embodiment is next described. Here, configuration that differs from that of the first example embodiment is described in detail, and detailed description regarding configuration that is the same as that of the first example embodiment is omitted.

In the light measurement device of the present example embodiment as well, optical axis adjustment is carried out in accordance with the procedures shown in FIG. 7. According to this optical axis adjustment method, the optical axis is adjusted such that the second interface image at the time that moving stage 45 has been caused to move to the first displacement position is equivalent to the first interference image at the time that moving stage 45 has been caused to move to the reference position. In a light measurement device in which this type of optical axis adjustment is carried out, an interference image equivalent to the first interference image can be maintained even when moving stage 45 is moved more than the displacement from the reference position to the first displacement position.

In the light measurement device of the present example embodiment, a Michelson interferometer is made up of branch part 31, phase-changing unit 41, phase-fixing unit 51, and multiplexer 61. A light source that is capable of supplying mid-infrared light is used as light source 11. However, the wavelength region of the light that is used is not limited to mid-infrared light, and the light may also be ultraviolet light, visible light, near-infrared light, or far-infrared light. Still further, a laser light source may also be used for light source 11.

In the light measurement device of the present example embodiment, spectrum measurement is carried out that applies Fourier transform infrared spectroscopy by causing moving stage 45 to move continuously to continuously change the phase of the light of phase-changing unit 41 after optical axis adjustment has been carried out.

More specifically, control unit 81 both causes moving stage 45 to continuously move and continuously records, as data, luminance values of each picture element of the interference image that is imaged as a two-dimensional image by detection unit 71 associated with the amount of movement of moving stage 45 (the amount of movement of phase-changing unit 41). Here, "continuously records" refers to successively stopping moving stage 45 at a multiplicity of discrete positions that have been determined in advance and recording, for each position, data that include the amount of movement and the luminance values of each picture element. Control unit 81 obtains information of the spectrum of each picture element by subjecting the recorded data to a Fourier transform for each picture element. In this way, information of the spectrum in a surface can be obtained for a two-dimensional image data that is detected by the imaging elements of detection unit 71.

According to the light measurement device of the present example embodiment, since a clear interference image can be obtained, in-plane spectrum information having high measurement precision can be obtained.

Further, the light measurement device of the present example embodiment can be applied not only to spectrum measurement but also to OCT that is described in background art.

Third Example Embodiment

The third example embodiment of the present invention is of a configuration that differs from the light measurement device described in the first example embodiment with regard to branch part 31, phase-changing unit 41, phase-fixing unit 51, and multiplexer 61.

The configuration of the light measurement device of the present example embodiment is next described. In the present example embodiment, configuration that differs from that of the light measurement device described in the first example embodiment is described in detail, and detailed explanation regarding configuration that is the same as that of the first example embodiment is here omitted.

Figure 11:
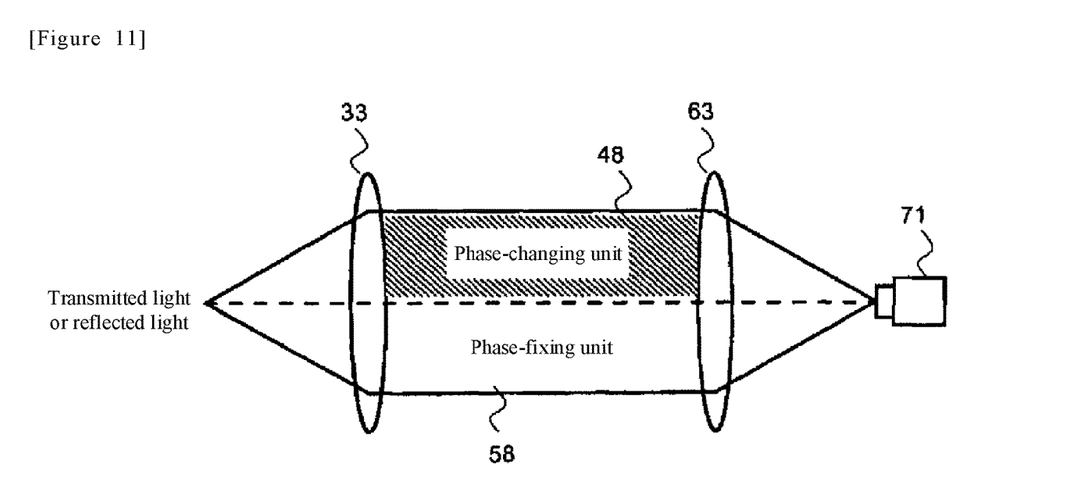
FIG. 11 shows an example of the configuration of the principal parts of the optical system of the light measurement device of the third example embodiment.

FIG. 11 shows an example of the main configuration of the light measurement device of the present example embodiment.

As shown in FIG. 11, in the present example embodiment, lens 33 is used for branch part 31 and lens 63 is used for multiplexer 61. Transmitted light or reflected light from measurement object 21 passes through lens 33. Lens 33 emits the transmitted light or reflected light from measurement object 21 as a parallel luminous flux. The light that has passed through lens 33 is split into two, one light beam traveling through phase-changing unit 48 and the other light beam traveling through phase-fixing unit 58. Each of the light beams that propagate through phase-changing unit 48 and phase-fixing unit 58 are reflected by mirrors, the mirror on the phase-changing unit 41 side being configured to allow movement by a moving stage. The quantity of light that travels through each of phase-changing unit 48 and phase-fixing unit 58 is preferably half of the quantity of light that passes through lens 33. As in the first example embodiment, an adjustment mechanism for adjusting the propagation direction of light is provided in at least one of phase-changing unit 48 and phase-fixing unit 58.

Lens 63 condenses the light from phase-changing unit 48 and the light from phase-fixing unit 58 on detection unit 71, whereby the light from phase-fixing unit 58 interferes with the light from phase-changing unit 48, and detection unit 71 detects this light that is interfered with. The information of the luminance values of the interference image that is two-dimensionally imaged by detection unit 71 is transmitted to control unit 81 by way of signal line 301.

The configuration of detection unit 71 and control unit 81 is the same as the configuration described in the first example embodiment, and light source 11 is of the same configuration as described in the second example embodiment, and the details of these components is therefore here omitted. In addition, the optical axis adjustment method realized by the light measurement device of the present example embodiment is the same as the procedures described with reference to the flow chart shown in FIG. 7, and a detailed explanation of these procedures is therefore here omitted.

In the light measurement device of the present example embodiment, a clear interference image can be obtained as in the first example embodiment, and high measurement precision can therefore be maintained.

In addition, although the two split light beams are reflected by mirrors to propagate on separate optical paths, the use of the two split light beams is not an essential requirement. For example, in the configuration shown in FIG. 11, a portion of the parallel luminous flux from lens 33 travels through phase-changing unit 48 and the remaining portion travels through phase-fixing unit 58. As an example, a spatial light modulator that is provided with a light modulation unit that modulates the phase of light is used as phase-changing unit 48. A light modulation unit is made up of an electro-optic crystal (such as a ferroelectric crystal) or liquid crystal, and control unit 81 is able to change the phase of light that propagates through phase-changing unit 48 by changing the refractive index of the light modulation unit. In this case, the phase difference can be continuously changed without using mirrors or a moving stage. However, in this case as well, an adjustment mechanism for adjusting the propagation direction of light is provided in at least one of phase-changing unit 48 and phase-fixing unit 58.

Fourth Example Embodiment

The fourth example embodiment of the present invention is a device that can deal with temporal change of an interference image in the light measurement device that is described in the first example embodiment.

The configuration of the light measurement device of the present example embodiment is similar to that of the light measurement device described in the first example embodiment and a detailed explanation is therefore here omitted. In the present example embodiment, configuration and operation that differs from that of the first example embodiment is described in detail.

In the present example embodiment, as in the first example embodiment, a Michelson interferometer is made up from branch part 31, phase-changing unit 41, phase-fixing unit 51, and multiplexer 61. In the present example embodiment, as in the second example embodiment, the position of moving stage 45 of phase-changing unit 41 is continuously changed to continuously change the phase of the light of phase-changing unit 41, whereby Fourier transform infrared spectroscopy can be applied.

In the present example embodiment, after carrying out adjustment of the optical axis in accordance with the procedures shown in FIG. 7, the adjustment of the optical axis is again carried out after the passage of a fixed time interval. The reasons for this procedure and the method itself are described more specifically below.

As explained in the section on problems of the background art, changes may occur in the position or angle of components by loosening of parts such as screws that make up an optical apparatus optical system due to vibrations or gravity. As a result, the optical axis of light that is supplied from a light source or the state or position of optical parts that make up the subsequent optical path may diverge from the state that immediately follows adjustment. In particular, in an optical device of a spatial system, the change in the state of the optical system is great and the position and optical axes of the optical components is difficult to continuously maintain over a long time interval. In addition, changes in the refractive index may occur due to the difference in air density that is caused by changes in temperature or the influence of air flow caused by the environment or air conditioning, and the state of the overall system may change. As a result, the interference image is preferably again observed after the passage of fixed time interval to continuously check the state of the optical system. Consequently, the light measurement device preferably undergoes the processes shown in FIG. 7 periodically. A specific example of this method is next described.

Control unit 81 records the luminance values of first bright portion 211, second bright portion 221, and third bright portion 231 in Step S104 of FIG. 7 at any time interval and records the luminance values of fifth bright portion 271 and third dark portion 281 in Step S108 at any time interval.

The time interval for recording of these five luminance values is considered and determined according to the environment in which the light measurement device is placed and the measurement precision that is requested.

The trend of the change of angle of mirrors 52 and 53 (the divergence of the propagation direction of light) is derived from the fluctuation of the luminance values of first bright portion 211, second bright portion 221, and third bright portion 231. In addition, the trend in the change of the direction of movement of moving stage 45 is derived from the fluctuation of the luminance values of fifth bright portion 271 and third dark portion 281. The optical system can be maintained in a normal state by executing the processes shown in FIG. 7 at a fixed period, and as a result, high measurement precision can be maintained.

In the light measurement device of the present example embodiment, a clear interference image can be obtained over a long period and high measurement precision can be maintained.

Although cases are described in which the transmitted light or reflected light from measurement object 21 is used in the optical axis adjustment method of the above-described first to fourth example embodiments, light that is supplied from light source 11 may also be directly applied to branch part 31 in a state in which there is no measurement object 21 and optical axis adjustment may be carried out beforehand. If described with the optical system shown in FIG. 3, light that is supplied from light source 11 shown by solid lines is directly applied as input to beam splitter 35 and the procedures shown in FIG. 7 are executed. In the optical system shown in FIG. 3, a mirror may be placed at the position of measurement object 21, the light that is supplied from light source 11 shown by broken lines may be reflected by the mirror and applied as input to beam splitter 35, and the procedures shown in FIG. 7 then executed.

Although the invention of the present application has been described above with reference to example embodiments, the invention of the present application is not limited to the above-described example embodiments. The configuration and details of the invention of the present application are open to various modifications within the scope of the invention of the present application that will be clear to one of ordinary skill in the art.

EXPLANATION OF REFERENCE NUMBERS

11 Light source
21 Measurement object
31 Branch part
41 Phase-changing unit
51 Phase-fixing unit
61 Multiplexer
71 Detection unit
81 Control unit

The invention claimed is:

1. A light measurement device comprising:
 a light source that irradiates light upon a measurement object;
 a phase-changing unit that changes a phase of first light that is one beam from among two split light beams realized by splitting transmitted light or reflected light of said light from said measurement object;
 a phase-fixing unit that maintains a phase of second light that is the other beam of said two split light beams;
 an adjustment mechanism that adjusts a propagation direction of said first light that is supplied from said phase-changing unit or a propagation direction of said second light that is supplied from said phase-fixing unit;
 a multiplexer that causes interference between said first and second light that are supplied from said phase-changing unit and said phase-fixing unit, respectively;
 an imaging element that detects light that is interfered with by said multiplexer; and
 a control unit that controls each of a phase change operation of said phase-changing unit and an adjustment operation of the propagation direction of light of said adjustment mechanism;
 wherein:
 said control unit causes said phase-changing unit to change the phase of said first light, causes said imaging element to detect a first interference image, and on the basis of the luminance values of three bright portion points in an image that shows said first interference image that is supplied from said imaging element, adjusts the propagation direction of said first or second light in said adjustment mechanism.

2. The light measurement device as set forth in claim 1, wherein said control unit causes said phase-changing unit to change the phase of said first light; causes said imaging element to detect a second interference image that is another interference image other than said first interference image; identifies in an image that shows said second interference image that is supplied from the imaging element a bright portion for which a luminance value becomes a maximum value and a dark portion for which a luminance value becomes a minimum value; and adjusts said propagation direction on the basis of the luminance values of the bright portion and the dark portion.

3. The light measurement device as set forth in claim 2, wherein said control unit adjusts said propagation direction on the basis of the luminance values of three bright portions in said first interference image and the luminance value of a bright portion in said second interference image.

4. The light measurement device as set forth in claim 2, wherein said control unit, at a fixed period, records the luminance values of three bright portions in an image that indicates said first interference image and luminance values of each of a bright portion, for which a luminance value becomes a maximum value, and a dark portion, for which a luminance value becomes a minimum vale, in an image that shows said second interference image, and adjusts said propagation direction on the basis of the recorded luminance values.

5. The light measurement device as set forth in claim 2, further comprising a branch that splits said transmitted light or reflected light from said measurement object, wherein one light beam that is split by said branch part is said first light and the other light beam that is split by said branch part is said second light.

6. The light measurement device as set forth in claim 5, wherein said control unit adjusts said propagation direction beforehand on the basis of luminance values of three bright portions in an image that shows said first interference image in a state in which light that is supplied from said light source is supplied as input to said branch part without passing through said measurement object.

7. The light measurement device as set forth in claim 5, wherein a Michelson interferometer-type light measurement device is made up of said branch part, said phase-changing unit, said phase-fixing unit, and said multiplexer.

8. The light measurement device as set forth in claim 2, further comprising a first lens that converts said transmitted light or reflected light from said measurement object to a parallel luminous flux;
wherein:
said parallel luminous flux from said first lens is branched into said first and second light; and
said multiplexer is made up of a second lens that condenses said first and second light upon said imaging element.

9. The light measurement device as set forth in claim 1, wherein said control unit, while continuously changing the phase of said first light, obtains luminance values for each picture element of an interference image that is captured by said imaging element corresponding to change of the phase and performs a Fourier transform upon data of the luminance values for each picture element of said interference image to find a spectrum.

10. A method of adjusting an optical axis comprising:
irradiating light upon a measurement object;
splitting transmitted light or reflected light realized by said light from said measurement object into two split light beams;
causing interference between first light that is one beam of said two split light beams and second light that is the other beam of said two split light beams;
changing a phase of said first light to detect an interference image and maintaining a phase of said second light; and
on the basis of the luminance values of three bright portion points in an image that shows said interference image, adjusting a propagation direction of said first or second light.

* * * * *